(12) United States Patent
Asahina et al.

(10) Patent No.: US 6,890,683 B2
(45) Date of Patent: May 10, 2005

(54) SEALED PRISMATIC BATTERY AND BATTERY MODULE

(75) Inventors: Takashi Asahina, Toyohashi (JP); Shinji Hamada, Toyohashi (JP); Toyohiko Eto, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 34 days.

(21) Appl. No.: 10/353,861

(22) Filed: Jan. 29, 2003

(65) Prior Publication Data

US 2003/0143458 A1 Jul. 31, 2003

(30) Foreign Application Priority Data

Jan. 29, 2002 (JP) .................................. 2002-019772

(51) Int. Cl.[7] .......................... H01M 2/30; H01M 2/06
(52) U.S. Cl. .................. 429/179; 429/178; 429/181; 429/185
(58) Field of Search ................. 429/160, 181

(56) References Cited

U.S. PATENT DOCUMENTS 3,844,841 A * 10/1974 Baker ...................... 136/111
4,383,011 A * 5/1983 McClelland ................ 429/54
6,455,190 B1 * 9/2002 Inoue ........................ 429/160

FOREIGN PATENT DOCUMENTS

| EP | 962993 | * 12/1999 | ............ H01M/2/02 |
| EP | 1087449 | * 3/2001 | ............ H01M/2/02 |
| JP | 2001-093503 | 4/2001 | |

* cited by examiner

Primary Examiner—Mark Ruthkosky
(74) Attorney, Agent, or Firm—Jordan and Hamburg LLP

(57) ABSTRACT

A sealed prismatic battery includes an electrode plate group having positive and negative electrode plates stacked upon one another with a separator interposed therebetween, collectors each connected to a lead portion on either side of the electrode plate group and having one or more connection bosses formed in a middle part thereof, and a battery case, generally rectangular in shape, for accommodating the electrode plate group connected with the collectors. The battery case has a through-hole for the connection boss of the collector to penetrate therethrough via a rubber seal. A battery module includes a plurality of the sealed prismatic batteries, the connection bosses of which are connected to each other.

12 Claims, 8 Drawing Sheets

SEALED PRISMATIC BATTERY AND BATTERY MODULE

The present disclosure relates to subject matter contained in priority Japanese Patent Application No. 2002-19772, filed on Jan. 29, 2002, the contents of which is herein expressly incorporated by reference in its entirety.

BACKGROUND OF THE INVENTION

1. Field of the Invention

The present invention relates to a sealed prismatic battery and a battery module having a plurality of sealed prismatic batteries integrally connected to one another, and particularly to a sealed prismatic battery and a battery module with lower internal resistance.

2. Description of Related Art

A conventional battery module is constructed of a plurality of cells that are formed in the shape of a rectangular prism and connected to each other to provide the required power capacity. The cells are arranged such that the longer lateral walls of their battery cases are placed adjacent to each other. Those cells disposed at both ends in this arrangement are each provided with an end plate on the exterior of their respective cases and then united by restraining bands together. In each cell, leads extending upwardly from the top ends of electrode plates are connected to their respective terminals mounted in the lid of the battery case, with all the terminals of the cells being connected to each other via connection plates.

Accordingly, this arrangement has a long connection path and a number of connections between the cells, thereby causing a high resistance derived from their components including their connection components. This leads up to the proportion of 40 to 50% of the components' resistance to the reaction resistance caused by the electrochemical reaction between the positive and negative electrode plates and liquid electrolyte. This high internal resistance causes a large amount of heat to be generated in the cells. Consequently, there was an obstacle to implementation of high power output and improvement in the battery life characteristics. There was also another problem that a number of components were required for the connections increased in complexity between the cells, thereby adding cost to the battery module.

In light of these problems, the applicants of the present invention have proposed in the past a sealed prismatic battery module 1 having a plurality of cells 2 housed therein as shown in FIG. 9 and FIG. 10. The battery module 1 has a prismatic battery case 3 constructed in the shape of a flat rectangular prism in which cell cases 4 of the prismatic cells 2, each cell case having short lateral walls and long lateral walls, are coupled integrally to each other with the short lateral walls shared as partition walls 5. The open top ends of the cell cases 4 are covered with an integral lid 6. There are formed connection holes 7 in an upper portion of each partition wall 5 and in the short lateral walls of the cell cases 4 disposed at both ends of the battery module 1. Within each cell case 4, an electrode plate group 8 which has rectangular positive and negative electrode plates stacked upon one another with separators interposed in therebetween is accommodated in conjunction with a liquid electrolyte. The cells 2 are constructed in this manner. The positive and negative electrode plates in the electrode plate group 8 are protruded to the sides opposite to each other and serve as positive and negative electrode leads 9*a*, 9*b*, respectively, to the respective side edges of which collector plates 10*a*, 10*b* are connected by welding or the like.

In an upper part of the collector plate 10*a*, 10*b*, there is provided a connection boss 11 that fits into the connection hole 7, such that the connection bosses 11 of the positive and negative collector plates 10*a*, 10*b* are connected by welding to each other between adjacent cell cases 4, 4. On the outer short lateral walls of the cell cases 4 at both ends of the battery module, there are also provided positive and negative connection terminals (electrode pole) 12 in the connection holes 7, respectively, such that connection bosses 13 of the connection terminals 12 are connected by welding to the connection bosses 11 of the collector plates 10*a*, 10*b*, respectively. In this manners the plurality of cells 2 housed in the prismatic battery case 3 are connected to each other in series to provide power output between the connection terminals 12, 12 disposed at both ends of the prismatic battery case 3.

The construction as shown in FIGS. 9 and 10 provides a short current flow path from the positive and negative electrode plates to their respective leads 9*a*, 9*b* and collector plates 10*a*, 10*b*. However, as shown by the arrows in FIG. 11, since the Collector plates 10*a*, 10*b* are connected by welding to each other at a point between the tips of the connection bosses 11 provided at the upper end portions of the collector plates 10*a*, 10*b*, the connection path takes a detour thereby being elongated. Additionally, the connection bosses 11 are connected to each other at one location, thereby presenting a problem of providing a high internal resistance. What is worse, as shown by the hollow arrows, since the connection path takes a detour, a large amount of current flows through the electrode plate group 8 near the connection bosses of the collector plates 10*a*, 10*b* whereas a small amount of current flows therethrough away from the connection bosses This causes the electrode plate group 8 to provide an uneven distribution of current flowing therethrough and uneven power output, thus leading to power loss.

SUMMARY OF THE INVENTION

The present invention has been developed in light of the aforementioned conventional problems. It is therefore an object of the invention to provide a sealed prismatic battery and a battery module having a plurality of sealed prismatic batteries connected to one another, which are reduced in internal resistance and the electrode plate group makes uniform use of their capabilities to provide high power output.

A sealed prismatic battery according to the present invention includes:

an electrode plate group having a positive electrode plate and a negative electrode plate stacked upon one another with a separator interposed therebetween, collectors each connected to a lead portion on either side of the electrode plate group and having one or more connection bosses formed in a middle part thereof, and a battery case, generally rectangular in shape, for accommodating the electrode plate group connected with the collectors, said battery case having a through-hole for the connection boss of the collector to penetrate therethrough via a seal member.

According to this structure, since the lead portions on both sides of the electrode plate group are connected with the collectors, the distance between each electrode plate and the collectors is straight and short. Additionally, the connection bosses formed in a middle part of the collector penetrate the battery case to serve as connections with the outside. Accordingly, this construction eliminates other additional connection members or connection points with the collector having a short current flow path, thereby providing the sealed prismatic battery having a reduced internal resistance. Furthermore, when there is provided a connection boss at the middle on the collector and particularly when a plurality of connection bosses are formed thereon, this construction provides an even distribution of current flowing through the electrode plate group to allow the electrode plate group to make uniform use of each power supply capability to provide high power output. Additionally, a plurality of the sealed prismatic batteries can be formed into the battery module such that those connection bosses having opposite polarities are abutted and welded to each other. This construction provides a battery module that has a predetermined power capacity, a reduced internal resistance as described above, and the electrode plate groups making uniform use of their power supply capabilities.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Embodiments of a sealed prismatic battery and a battery module comprised thereof according to the present invention will be described below with reference to FIGS. 1 to 6.

Figure 1:
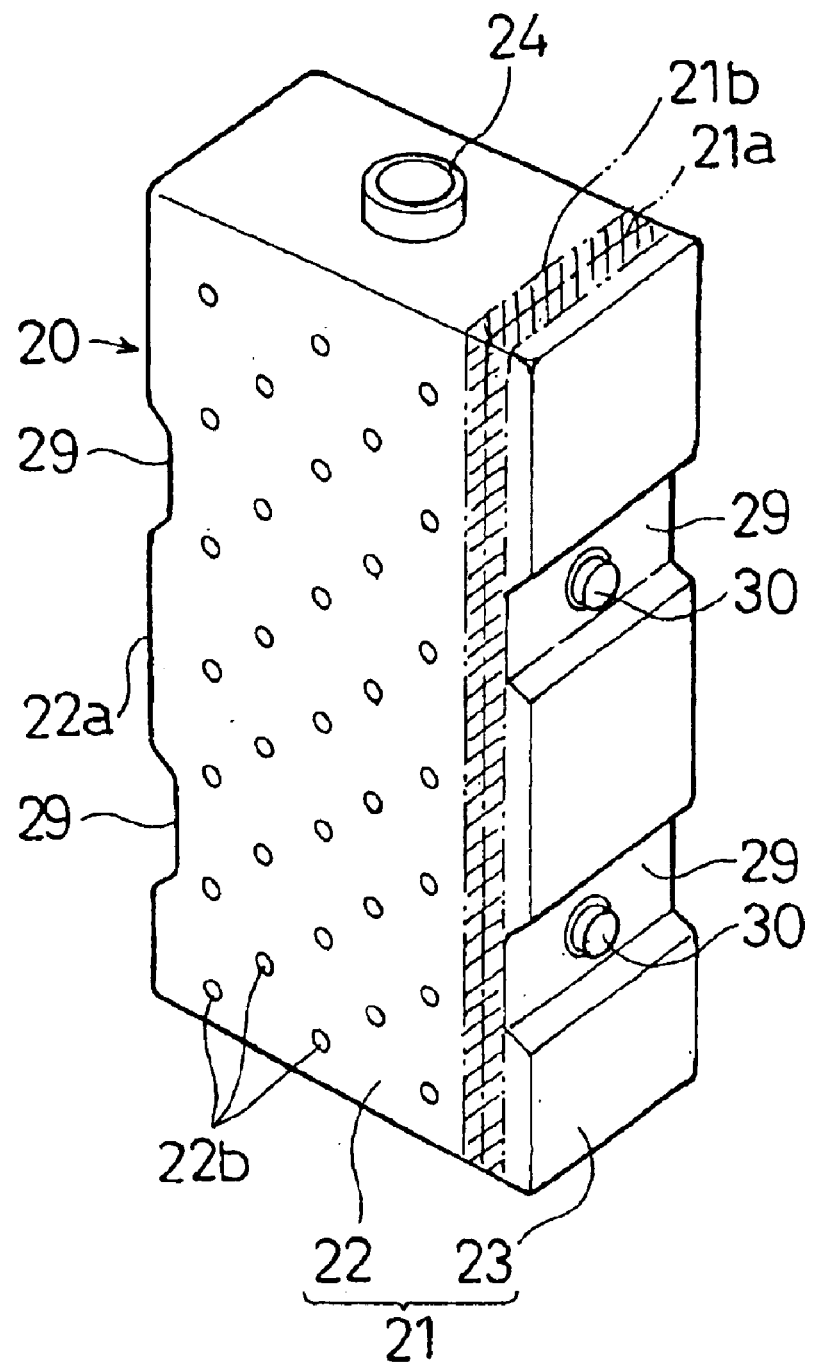
FIG. 1 is a perspective view showing an outer appearance of a sealed prismatic battery according to an embodiment of the present invention.
Figure 2:
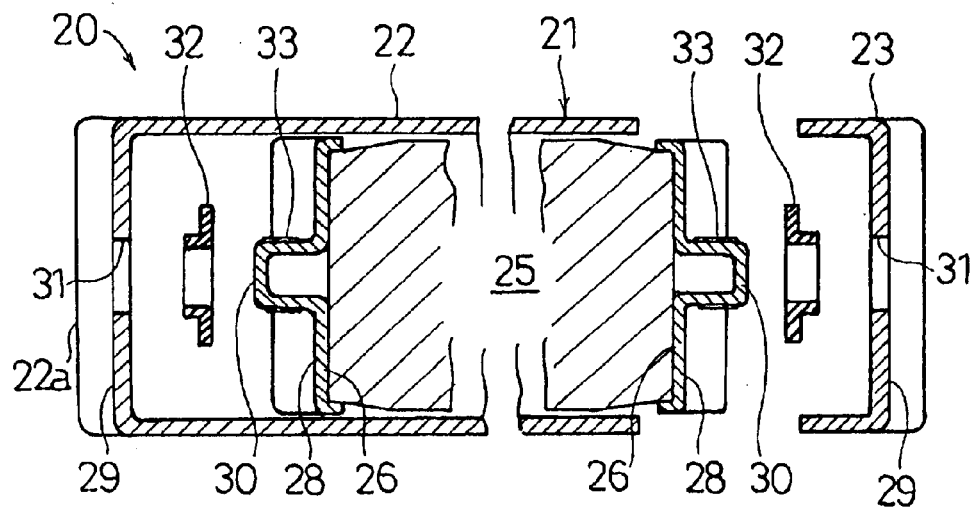
FIG. 2 is an exploded transverse sectional view showing the sealed prismatic battery according to the embodiment.
Figure 3:
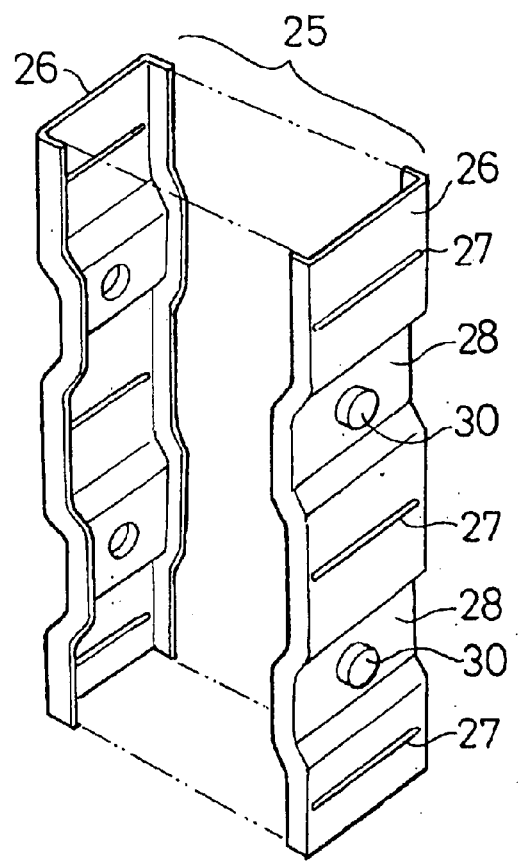
FIG. 3 is a perspective view showing collectors disposed on both sides of an electrode plate group according to the embodiment.

In FIGS. 1 to 3, a sealed prismatic battery 20 according to this embodiment is illustrated which includes a battery case 21 made of synthetic resin such as an alloy of PP and PPE, having resistance to liquid electrolyte. As illustrated, the battery case 21 is formed in the shape of a sealed rectangular prism. The battery case 21 has a battery case body 22 having an opening on one short lateral side and a cover assembly 23 for covering the opening, the battery case body 22 and the cover assembly 23 being integrally welded. In the drawing, there are also shown a juncture plane 21a between the battery case body 22 and the cover assembly 23, and heat-melted burrs 21b formed through the welding. A short lateral wall 22a is opposite to the opening of the battery case body 22. Projections 22b are disposed at appropriate intervals on the long lateral walls of the battery case body 22 in order to form a coolant pathway between the sealed prismatic batteries 20 arranged in parallel to one another. On the top end wall of the battery case 21, there is provided a safety vent hole 24.

As shown in FIG. 2, an electrode plate group 25 having collectors 26 each connected to an end thereof are housed in the battery case 21 in conjunction with a liquid electrolyte, thereby forming a cell. The electrode plate group 25 is constructed such that a plurality of positive electrode plates and a plurality of negative electrode plates are alternately stacked upon one another with a bag-shaped separator, having an opening in a lateral direction, disposed between the positive and negative electrode plates, each positive electrode plate being covered with the separator. One side of the positive electrode plates is projected in one direction and the other side of the negative electrode plates is projected in the other direction, and the sides are each provided with their respective positive and negative electrode lead portions, on each of which provided is the collector 26 formed of a steel plate that is plated with nickel.

The positive electrode plate is made of a nickel foam metal coated with nickel hydroxide except for the lead portion The lead portion is constructed such that a compression pressure is applied to the foam metal and a lead plate is ultrasonically seam-welded onto a surface thereof. On the other hand, the negative electrode plate is made of a nickel punched metal coated with negative electrode constituent materials including hydrogen-absorption alloy except for the lead portion.

The electrode plate group 25 is not limited to such a construction in which a plurality of rectangular positive and negative electrode plates are stacked upon another with the separators interposed therebetween. Positive and negative electrode strips, each having a lead portion on the sides opposite to each other, can be stacked upon another with separators interposed therebetween and then wound in the shape of an ellipse in cross section or in the shape of a substantial rectangle with a separator placed on the top or bottom of the stack. To match with this construction, the battery case 21 can be nearly elliptic or approximately rectangular in longitudinal section.

The collectors 26 and the lead portions of the electrode plate group 25 are welded to each other by electron beam welding at joint portions 27 that are provided on the collectors 26 at a plurality of portions (at three portions in the drawing, i.e., at the upper, middle, and lower portions) at appropriate vertical intervals. On the collectors 26, there are formed recessed portions 28 across the entire width thereof at two portions in between the three joint portions 27. Additionally, corresponding to the recessed portions 28, there are formed lateral recessed portions 29 on both short lateral sides of the battery case 21 or on the short lateral wall 22a and the cover assembly 23.

There are provided connection bosses 30 at the center of each recessed portion 28 on the collectors 26, while through-holes 31, through which the connection bosses 30 pierce, are formed at the center of each recessed portion 29 of the battery case 21. The connection bosses 30 are designed in height to be generally flush at their tip with the outer surface of the short lateral wall of the battery case 21. The vertical dimensions of the recessed portions 28, 29 are designed to provide an appropriate space, above or below the connection bosses 30 or the through-holes 31, which is just enough to allow for connecting between the connection bosses 30, 30, discussed later.

As shown in FIG. 2, a rubber seal 32 that serves as a seal member is interposed between the connection boss 30 and the through-hole 31 to ensure the sealing of the battery case 21. Additionally, the connection boss 30 is coated on the outer circumference thereof with a sealant 33 such as pitch to ensure the sealing between the connection boss 30 and the rubber seal 32.

The sealed prismatic battery 20 having the aforementioned construction is manufactured as follows. As shown in FIG. 3, the electrode plate group 25 is formed, and the collectors 26 are then disposed on both sides thereof and joined together at the joint portions 27. Thereafter, as shown in FIG. 2, the sealant 33 is applied around the outer circumference of the connection bosses 30, over which the rubber seals 32 are press fitted. With this arrangement, the electrode plate group 25 is inserted into the battery case body 22. The opening of the battery case body 22 is covered with the cover assembly 23, which is then welded to the battery case body 22, to thereby form the sealed battery case 21. Then, after a liquid electrolyte is dispensed through the safety vent hole 24, a safety vent is attached thereto, thus providing a complete sealed prismatic battery 20 serving as a cell as shown in FIG. 1.

Figure 4:
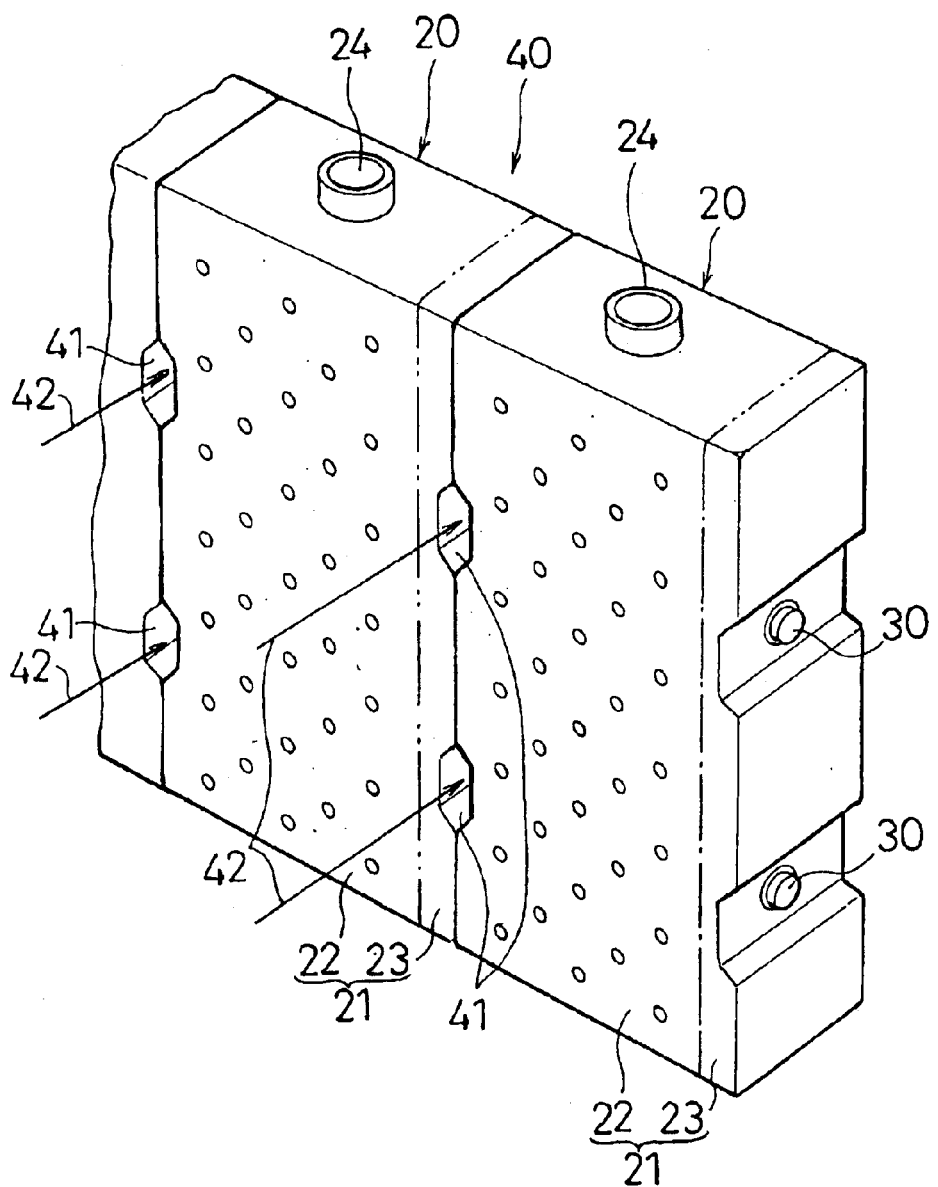
FIG. 4 is a perspective partial view showing a battery module according to the embodiment.
Figure 5A:
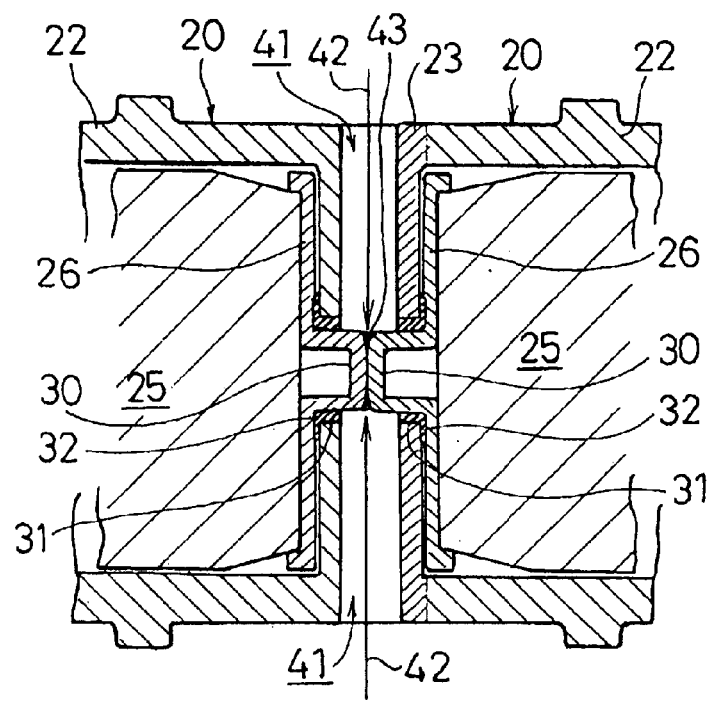
FIG. 5A is a transverse sectional plan view and FIG. 5B is a longitudinal sectional front view, both showing a joint portion in the battery module according to the embodiment.
Figure 5B:
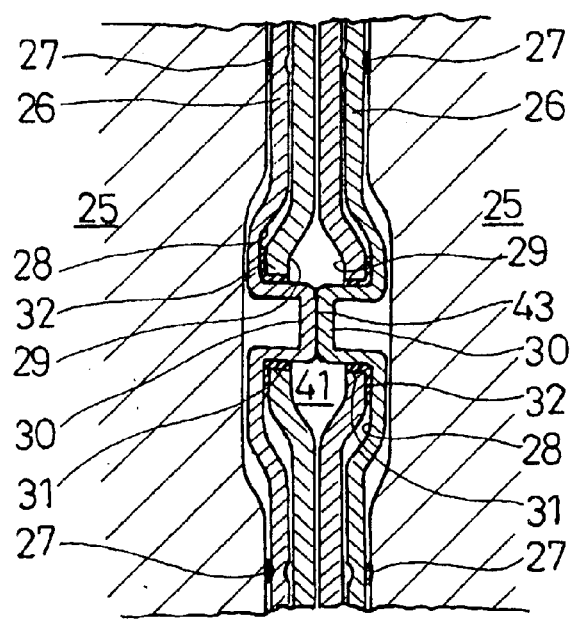

As shown in FIGS. 4 to 5B, a predetermined number of sealed prismatic batteries 20 described above are connected to one another to form a battery module 40. That is, a predetermined number of sealed prismatic batteries 20 are formed into the battery module 40 such that the short lateral walls of the batteries on which the connection bosses 30 are provided are opposed to one another, and then the tips of the connection bosses 30, 30 abutting to each other are irradiated with a laser beam or an electron beam 42 through a joint space 41 provided by the recessed portions 29.

To facilitate the construction in the forgoing, on the short lateral wall 22a having the connection bosses 30 thereon and the outer surface of the cover assembly 23, mating portions are preferably provided to allow the short lateral wall 22a and the cover assembly 23 to mate with each other when abutted to each other.

Figure 6:
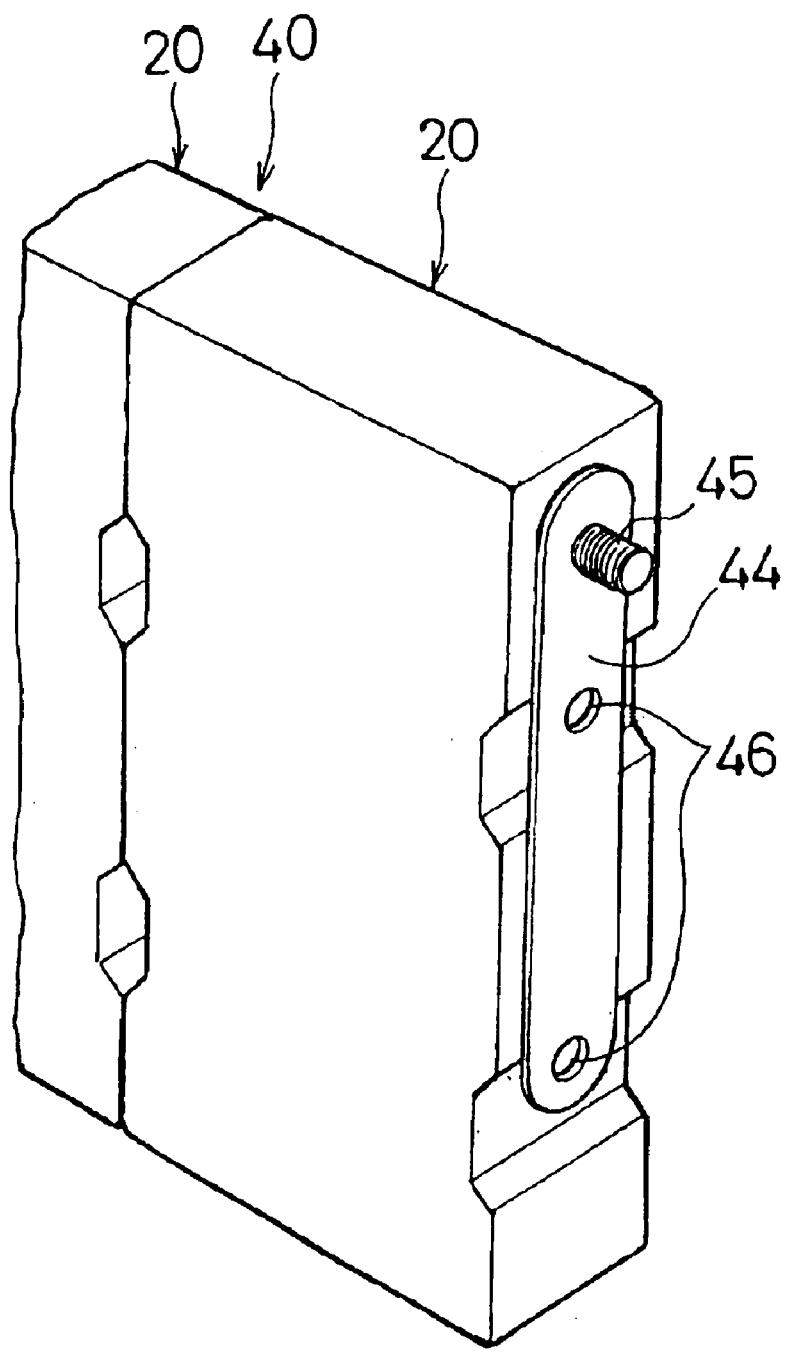
FIG. 6 is a perspective view showing the battery module provided with an electrode pole according to the embodiment.

On the other hand, as shown in FIG. 6, a connection plate 44 on the upper portion of which provided is an electrode pole 45 is abutted to the outer side, having the connection bosses 30 thereon, of the sealed prismatic batteries 20 disposed at both ends of the battery module 40, This arrangement allows the connection plate 44 and the connection bosses 30 to be welded to each other at joint portions 46 by resistance welding or laser welding. It is thus made possible to apply this general connection arrangement employing the electrode pole 45 to connect the battery module 40 to an external circuit or the like.

According to the sealed prismatic battery 20 and the battery module 40 constructed as described above, since the lead portions on both sides of the electrode plate group 25 are connected with the collectors 26, the distance between each portion of each electrode plate and the collectors 26 is straight and short. Additionally, the connection bosses 30 formed in a middle part of the collector 26 penetrate the battery case 21 to serve as connections with the outside. Accordingly, this construction has no other additional connection members or connection points with the collector 26 having a short current flow path, thereby providing the sealed prismatic battery 20 having a reduced internal resistance. Furthermore, there are provided a plurality of connection bosses 30 spaced appropriately from one another evenly on the collector 26. This provides an even distribution of current flowing through the electrode plate group 25 to allow the electrode plate group 25 to make uniform use of each power supply capability to provide high power output.

A plurality of sealed prismatic batteries 20 are formed into the battery module 40 such that those connection bosses 30, 30 having opposite polarities are abutted and welded to one another at welding portions 43. This construction provides a battery module that has a predetermined power capacity, a reduced internal resistance, and an electrode plate group making uniform use of its power supply capabilities.

Furthermore, the electrode plate group 25 and the collector 26 are connected to each other at a plurality of joint portions 27 disposed at appropriate intervals on the collector 26 in the longitudinal direction thereof, with the connection bosses 30 disposed in between the joint portions 27, 27. In this arrangement, the current flow path from the outside to the electrode plate group 25 leads from the connection boss 30 through the collector 26 to the joint portion 27 between both the electrode plate groups 25, thereby allowing current to flow through a short current flow path and from a plurality of joint portions 27 to the electrode plate group 25. This allows the distribution of current flowing through the electrode plate group 25 to be further equalized as well as the electrode plate group 25 to make uniform use of its power supply capabilities and provide high power output.

Furthermore, the portions, having the connection bosses 30 thereon, of the short lateral wall 22a of the battery case body 22 and the cover assembly 23 are formed on the recessed portions 29 that extend in the lateral direction thereof and are recessed by the amount of projection of the connection bosses 30. When a plurality of sealed prismatic batteries 20 are connected to one another to form the battery module 40, with the short lateral walls having the connection bosses 30 thereon of the battery case 21, the connection bosses 30 can be irradiated with the laser beam or electron beam 42 in the lateral direction of the joint space 41 defined by the recessed portions 29 and can thereby be connected to each other at the welding portions 43. Accordingly, it is possible to connect the connection bosses 30 to one another with good productivity and high reliability. Additionally, since the connections of the connection bosses 30 are located inside the recessed portions 29, the battery case 21 provides protection thereto.

Furthermore, corresponding to the recessed portions 29 of the battery case 21, the recessed portions 28 are formed on the collectors 26 and the connection edges of the electrode plate group 25 connected to the collectors 26. Even with the recessed portions 29 being provided, this construction provides improved space efficiency to the battery case by effectively making use of the dead spaces present above or below the recessed portions 29.

The battery case 21 is also constructed such that the battery case body 22 having an opening on a surface thereof for inserting the electrode plate group 25 and the cover assembly 23 for covering the opening are integrally welded. Accordingly, even with the protruding connection bosses 30 and the recessed portions 29 present on the battery case 21 as described above, this construction makes it possible to accommodate and seal the electrode plate group 25 with a good productivity to construct the sealed prismatic battery 20.

Figure 7:
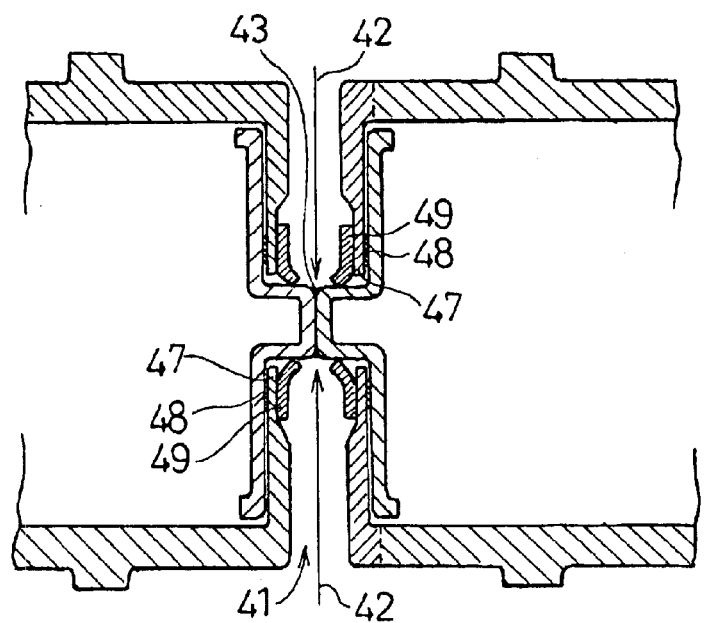
FIG. 7 is a transverse sectional plan view showing a modified example of a joint portion in the battery module according to the embodiment.

The aforementioned embodiment has been described in accordance with an example of employing the rubber seal 32 as a seal member interposed between the connection boss 30 and the through-hole 31. However, as shown in FIG. 7, the short lateral wall 22a of the battery case body 22 and a portion of the cover assembly 23 around the through-hole 31 can be formed on a reduced-thickness portion 47, with a rubber seal 48 and a sealant such as pitch being filled between the inner surface thereof and the peripheral portion of the connection boss 30. Then, using a crimp washer 49 having an inner circumference edge engaged with the outer circumference of the tip of the connection boss 30, the short lateral wall 22a and the outer surface of the peripheral portion of the through-hole 31 can be pushed against the collector 26.

Figure 8:
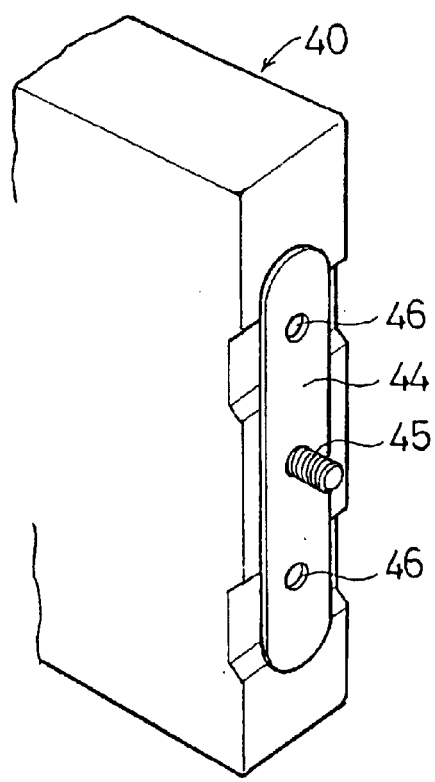
FIG. 8 is a perspective view showing a modified example of a battery module provided with an electrode pole according to the embodiment.
Figure 9:
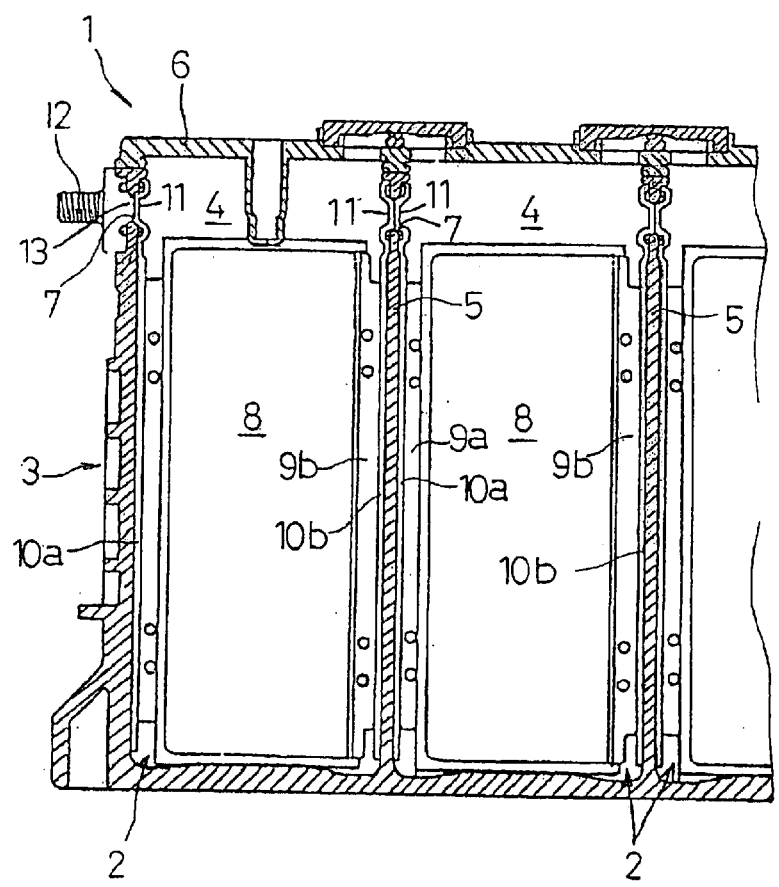
FIG. 9 is a longitudinal partial front view showing a conventional sealed prismatic battery module.
Figure 10:
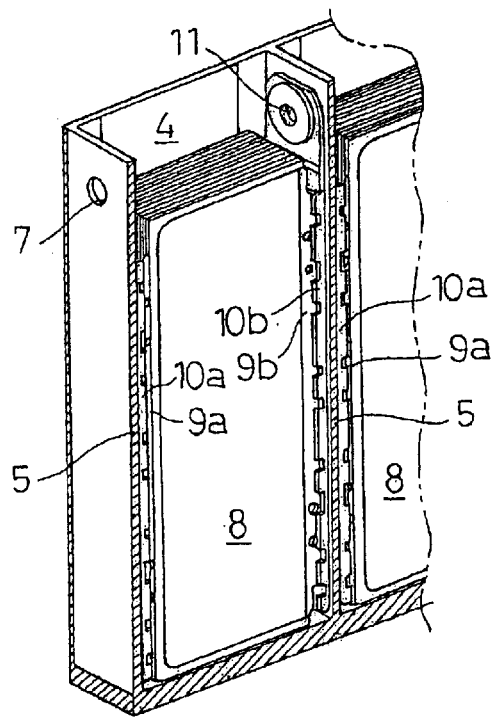
FIG. 10 is a partially broken perspective view showing a battery case in the conventional battery module.
Figure 11:
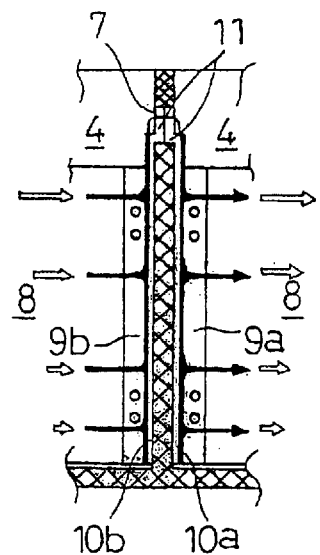
FIG. 11 is an explanatory view showing a current flow path in the conventional battery module.

Such an example has also been described in which the connection plate 44 on the upper portion of which provided is the electrode pole 45 is disposed at both ends of the battery module 40. However, as shown in FIG. 8, such a connection plate 44 can also be disposed which has the electrode pole 45 at the center thereof. The connection plate 44 can be modified in this manner, thereby making it possible to dispose the electrode pole 45 for external connection at any position.

According to the sealed prismatic battery and the battery module of the present invention, the lead portions on both sides of the electrode plate group are connected with the collectors, and the connection bosses formed in a middle part of the collector penetrate the battery case to serve as connections with the outside. Accordingly, this construction eliminates additional connection members or connection points with the collector having a short current flow path, thereby providing the sealed prismatic battery having a reduced internal resistance. Furthermore, particularly when a plurality of connection bosses are formed on the collector, this construction provides an even distribution of current flowing through the electrode plate group to allow the electrode plate group to make uniform use of its power supply capabilities to provide high power output.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed prismatic battery, comprising:

an electrode plate group having a positive electrode plate and a negative electrode plate stacked upon one another with a separator interposed therebetween;

collectors each connected to a lead portion on either side of the electrode plate group and having at least one connection boss formed in a middle part thereof; and a prismatic battery case for accommodating the electrode plate group connected with the collectors, said battery case having a through-hole for the connection boss of the collector to penetrate therethrough via a seal, the electrode plate group and the collectors being connected to each other at a plurality of connection points disposed at appropriate intervals in a longitudinal direction of the collectors, with the connection boss being disposed between the connection points.

2. A sealed prismatic battery, comprising:

an electrode plate group having a positive electrode plate and a negative electrode plate stacked upon one another with a seperator interposed therebetween;

collectors each connected to a lead portion on either side of the electrode plate group and having at least one connection boss formed in a middle part thereof; and a prismatic battery case for accommodating the electrode plate group connected with the collectors, said battery case having a through-hole through which the connection boss of the collector penetrates to an outside thereof;

wherein a portion of the battery case corresponding to the connection boss penetrating therethrough is provided with a recessed portion, the recessed portion extending laterally across a side of the battery case and being recessed generally by an amount of protrusion of the connection boss.

3. A sealed prismatic battery, comprising:

an electrode plate group having a positive electrode plate and a negative electrode plate stacked upon one another with a separator interposed therebetween;

collectors each connected to a lead portion on either side of the electrode plate group and having at least one connection boss formed in a middle part thereof; and a prismatic battery case for accommodating the electrode plate group connected with the collectors, said battery case having a through-hole for the connection boss of the collector to penetrate therethrough via a seal, a portion of the battery case corresponding the connection boss penetrating therethrough being provided with a recessed portion, the recessed portion extending laterally across a side of the battery case and being recessed generally by an amount of protrusion of the connection boss, the collectors and lead portion of the electrode plate group connected to the collectors are projected and recessed along sides of the battery case corresponding to the connection bosses penetrating therethrough.

4. The sealed prismatic battery according to claim 2, wherein:

the battery case includes a battery case body having an opening on a surface thereof for inserting the electrode plate group and a cover assembly for closing the opening, the battery case body and the cover assembly being integrally welded to each other; and through-holes are formed on a lateral wall opposite to the opening of the battery case body and the cover assembly.

5. A battery module comprising a plurality of the sealed prismatic batteries according to claim 2, wherein:

the plurality of sealed prismatic batteries are disposed such that lateral walls thereof having the connection boss formed thereon are opposed to each other to allow mutual connection between the connection bosses facing each other.

6. The battery module according to claim 5, wherein:

connection plates each provided with an electrode pole thereon are abutted to respective outer sides, each having the connection boss formed thereon, of the sealed prismatic batteries disposed at both ends of the battery module; and the connection plates are connected to the respective connection bosses.

7. A sealed prismatic battery, comprising:

an electrode plate group having at least one positive electrode plate and at least one negative electrode plate stacked upon one another with a separator interposed therebetween;

a positive collector and a negative collector connected to on either side of the electrode plate group to said at least one positive electrode plate and said at least one negative electrode plate, respectively, each of said positive and negative collectors including at least one connection boss formed at a location along each of said positive and negative collectors which is laterally adjacent to a position occupied by said electrode plate group; and a prismatic battery case for accommodating the electrode plate group connected with the collectors, said battery case having an opening to an outside in each of opposed lateral walls thereof through which the connection boss protrudes when the electrode group is received within the battery case;

wherein said opposed lateral walls include recessed portions which are recessed from an outer surface thereof, a specified one of said at least one connection boss being located within a region of each of said recessed portions, a tip of said specified connection boss being substantially flush with said outer surface.

8. The sealed prismatic battery according to claim 7, wherein respective ones of said openings in said battery case on each of the opposed lateral walls thereof and each said connection boss protruding therethrough are positioned at approximately a same height as one another on both opposed lateral walls.

9. The sealed prismatic battery according to claim 7, further comprising a seal received between the connection boss and the opening.

10. The sealed prismatic battery according to claim 7, wherein said at least one positive electrode plate and said at least one negative electrode plate includes a plurality of positive and negative electrode plates.

11. A battery module comprising a plurality of the sealed prismatic batteries according to claim 8, wherein:

the plurality of sealed prismatic batteries are disposed such that said lateral walls thereof having the at least one connection boss protruding therefrom are arranged to confront one another thereby allowing mutual connection between a confronted pair of connection bosses of adjacent ones of the plurality of sealed prismatic batteries.

12. The sealed prismatic battery according to claim 7, wherein said separator includes a bag having an opening in a lateral direction thereon and which is received over at least one of the at least one positive electrode plate and the at least one negative electrode plate.

* * * * *